(No Model.) 3 Sheets—Sheet 1.
C. L. AMES & A. H. FROST.
DEVICE FOR FASTENING SPRINGS TO BED SLATS.
No. 276,548. Patented May 1, 1883.
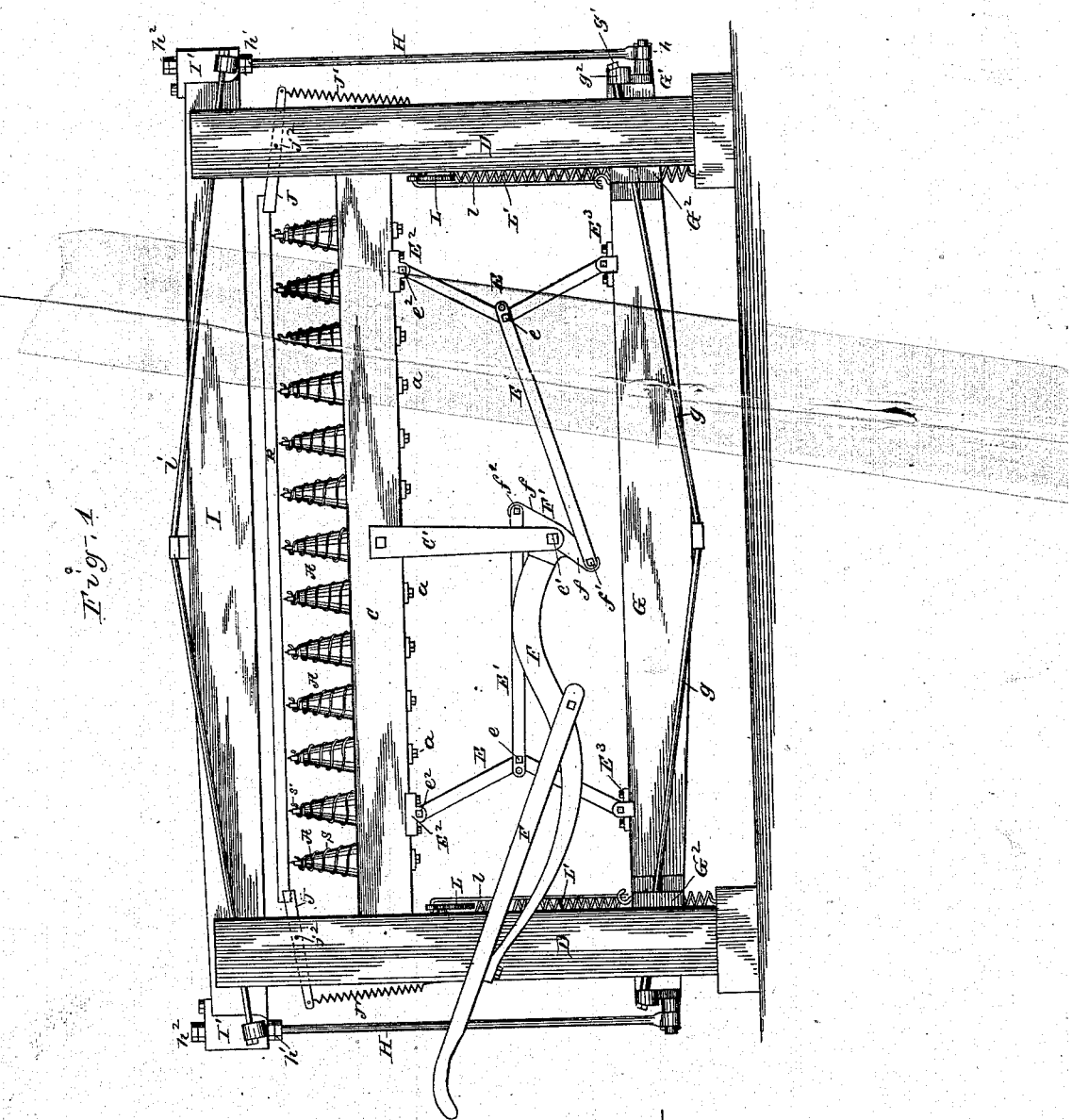

(No Model.) 3 Sheets—Sheet 2.
C. L. AMES & A. H. FROST.
DEVICE FOR FASTENING SPRINGS TO BED SLATS.
No. 276,548. Patented May 1, 1883.
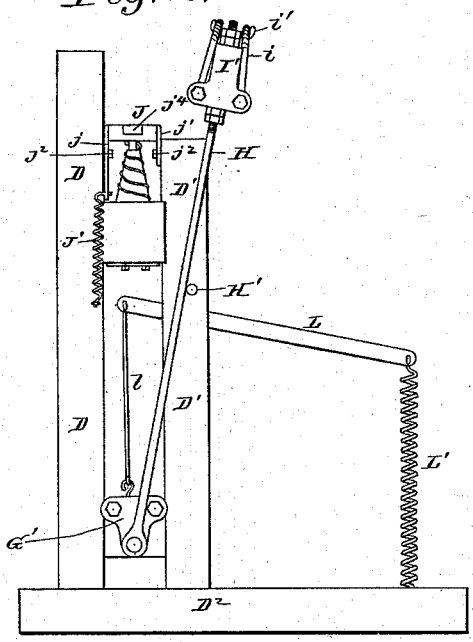
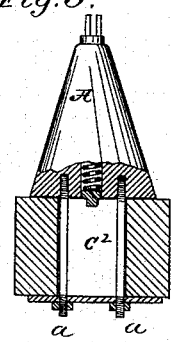
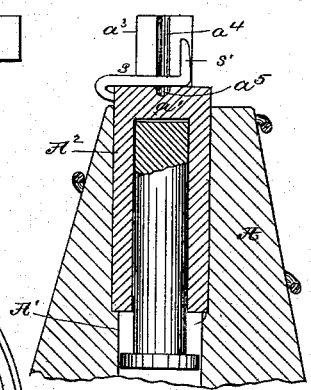
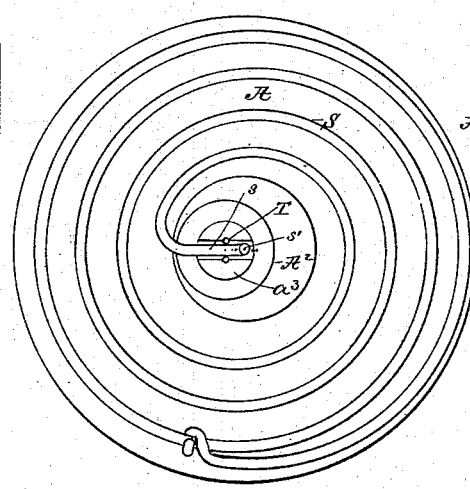
WITNESSES
F. W. Adams
C. Clarence Poole
INVENTOR
Charles L. Ames
Abel H. Frost
per W. E. Dayton
Attorney
N. PETERS, Photo-Lithographer, Washington, D. C.

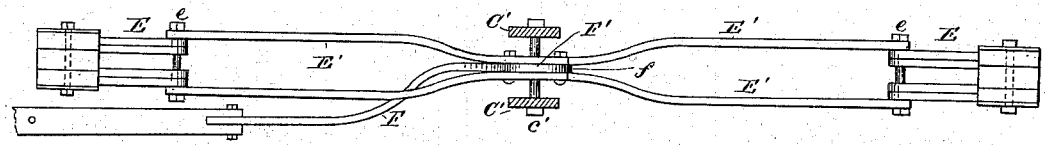
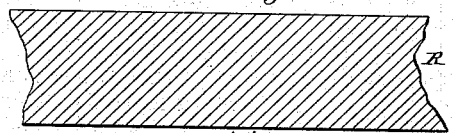

UNITED STATES PATENT OFFICE.

CHARLES L. AMES AND ABEL H. FROST, OF CHICAGO, ILLINOIS.

DEVICE FOR FASTENING SPRINGS TO BED-SLATS.

SPECIFICATION forming part of Letters Patent No. 276,548, dated May 1, 1883.

Application filed September 28, 1882. (No model.)

*To all whom it may concern:*

Be it known that we, CHARLES L. AMES and ABEL H. FROST, of the city of Chicago, in the county of Cook and State of Illinois, have invented certain new and useful Improvements in Devices for Fastening Springs to Bed-Slats; and we do hereby declare that the following is a full, clear, and exact description thereof, reference being had to the accompanying drawings, and to the letters of reference marked thereon, which form a part of this specification.

This invention relates to the manufacture of that class of conical wire-spring bed-bottoms in which a series of springs are attached to each of a number of wooden slats, afterward placed side by side upon a frame, and in which the tops of the springs are usually connected to each other by links or otherwise.

It relates more particularly to machines for fastening the springs upon the slats preparatory to their being placed together to form the bed-bottom; and it consists in the several matters hereinafter described and claimed.

The kind of conical springs which our machine is more particularly designed to fasten to the slats is that in which the wire forming the spring is bent diametrically part way across the small end of the cone and has its extremity bent outward at right angles to the transverse portion and in or nearly in the axis of the cone, so as to form a short point or spur, intended to be driven into the wood to assist in fastening the spring to the slat. This end being forced into the slat, the adjacent transverse part of the wire, above referred to, lies flat upon or in the surface of the slat, and the fastening is completed by a staple thrust into the wood astride this transverse part of the wire. The attachment of the springs to the slat, as above described, has heretofore been performed by manual labor, the spring being held in position upon the slat with the hand, and the point or spur then driven into the wood with a hammer, a sufficient blow usually being struck to partially or entirely embed the transverse portion of the wire in the surface of the slat, after which the staple is driven in the position stated by a second operation.

The object of our invention is to provide a machine to perform this work of attaching the springs to the slats.

In the drawings, Figure 1 is a front elevation of the machine. Fig. 2 is an end elevation thereof, and the remaining figures are details.

S, Figs. 5 and 9, represents the form of spring which our machine is intended to apply, $s$ being the transverse portion of the wire at the apex of the cone, and $s'$ the outwardly-turned end of the wire, also at the apex and proximately in the axis of the cone.

A A are a series of truncated metal cones, preferably of cast-iron, which are arranged and fixed with their larger ends or bases downward at equal or desired intervals upon a rigid horizontal beam, C, by means of bolts $a$, Fig. 3. The cones A A are approximately of the shape of the springs S, which, for this purpose, are placed upon the cones, as shown in several figures of the drawings. Each of the cones A is provided with a circular vertical aperture, A', which has its axis parallel with and at one side of the axis of the cone, as illustrated in Figs. 4 and 5. The aperture A' is enlarged at its upper portion to receive a stationary thimble, $A^2$, which projects slightly above the top of the cone, and is provided with a fixed central cross-bar, $a'$, at its upper end. The thimble $A^2$ serves as a bearing for a vertically-sliding pin, $A^3$, which, as here shown, extends downward below the lower end of the thimble $A^2$ into the aperture A', and has an enlarged head, $a^2$, which rests upon an expanding coiled spring, $A^4$, supported by a screw-plug, $A^5$, tapped into the lower end of the aperture A' at the base of the cone. The upper end of the pin $A^3$ is bifurcated, so as to straddle the cross-bar $a'$, and when said pin is raised its bifurcated ends extend about half an inch above the top of the thimble. The object of the pin $A^3$ thus constructed and supported by the spring $A^4$ is to form a yielding guide and holder for the small end of the bed-spring S and for the staple T, preparatory to forcing said staple and the spur $s'$ of the bed-spring into the slat. For this purpose the inner faces of the bifurcated ends $a^3$ of the pin $A^3$ are oppositely and vertically grooved at $a^4$, (seen in Fig. 4,) and preferably the cross-bar $a'$ is provided with a transverse groove, $a^5$, in line with the grooves $a^4$, as also seen in Fig. 4. In applying the bed-spring to the cone preparatory to attaching it to the slat, the staple T is first set with its points upward in the opposite grooves, $a^4$, of the bifurcated ends $a^3$ of the pin $A^3$, and the bed-spring is then dropped over the cone A, with its transverse part $s$ lying between the legs of the staple and upon the cross-bar $a'$, as shown plainly in Figs. 4, 5, 6, and 7. The bed-spring is fastened to the slat by placing the latter over the upwardly-projecting staple-points and forcing it squarely downward, in which operation the slat, after the staple-points are fairly entered into the wood, is brought to bear upon the ends $a^3$ of the yielding pin $A^3$, and the latter is carried downward until the slat strikes the top of the thimble $A^2$, and the staple and spur $s'$ are forced into the wood.

The cones A A are attached to the beam C at the distance from each other at which it is desired to have the springs stand when attached to the slats. The bolts $a\,a$, which secure the several cones, are tapped into the base of the latter and pass downward through a slot or slots, $C^2$, in the beams, so as to be movable thereon, and at their lower ends are provided with washers and threaded nuts $a'$, by which they may be secured firmly at any desired points on the beam.

In the machine for simultaneously attaching several springs to a bed-slat the beam C is secured at each end between the vertical stationary posts D D', Fig. 4. Below the beam C, and parallel with it, is a rigidly-trussed beam, G, vertically movable between the posts D and D', which beam G is connected with the beam C by a system of toggles, E E, arranged to bear the beam G downward. Said toggles E E may be operated by any desired form of connections for the purpose. As here shown, they are worked by a lever, F, by means of appropriate connecting-rods, E', pivoted to the ends of a short cross-arm, F', upon said lever and to the knuckles of the toggles E E. The ends of the beam G extend through the space between the posts D D', which serve as guides for it at both ends of the machine, and is connected at its ends by vertical rods H H to the ends of a similarly-trussed horizontal beam, I, located at the top of the machine and above the cones A. The rods H H are attached to the ends of the beam G by pivotal connections adapted to allow a lateral movement to the beam I, so that it may be moved from its position over the cones when it is desired to place the springs upon the latter or to remove the slats after the springs have been attached thereto.

J J are yielding spring-rests, which, as here shown, are pivoted to the posts D D' at either end of the machine, intended and adapted to receive the ends of the slat R and to hold it in the proper position laterally and longitudinally over the cones, preparatory to being forced downward in the operation of attaching the springs thereto. After the slat is so placed the beam I is brought into position vertically over the slat, and, by means of the toggles and lever described, is depressed to force the staples and spurs of the bed-spring into the slat, thereby simultaneously fastening the entire series of springs by a single movement. The beam I is usually brought down with sufficient force to embed the transverse part $s$ of the bed-spring into the surface of the slat, and thereby materially increase the strength of the attachment.

The beam C is fastened between the posts D and D' by being notched into the said posts at its ends, in order to resist vertical strain, and is additionally secured by bolts passing through the posts and the ends of the beam.

The toggle for operating the presser-beam I may be of any desired construction. As herein illustrated, C' is a hanger, consisting of two plates bolted upon either side of the beam C. Between the lower ends of the plates, and on the bolt $c'$, is pivoted the operating-lever F, said lever having a cross-head, F', consisting of two short arms, $f\,f$, which extend equally upon either side of its pivotal point. Pivoted at the ends of the arms $f\,f$, and extending in opposite directions, are two double connecting-rods, E' E', which are attached at their outer ends to the knuckle-joints of the toggles E E. The upper members of the toggles E are pivoted by pins $e^2$ to plates $E^2$, notched into the lower surface of the beam C, near its ends, and the lower members of the toggles are similarly connected to plates $E^3$ bolted to the beam G vertically beneath or opposite the plates $E^2$.

The beam G, as before stated, is of sufficient length to extend beyond the posts D D', between which it is guided, and is trussed to give it additional rigidity by means of rods $g\,g$, arranged one upon each side of the beam, and attached to lugs $g'\,g'$, projecting from either side of the upper portion of the end plates, G' G'. At the middle of the beam G the truss-rods pass under the laterally-projecting downturned ends of an iron cross-bar, $g'$, attached to the lower side of the beam, and are provided with nuts on their threaded ends. Between the guide-posts D D' the truss-rods lie in grooves made for them in pieces attached to the sides of the beam, so as to give proper bearing-faces to the latter, and suitable cleats, $G^2$, are secured to the beam, near the posts D D', to hold the beam longitudinally in position.

The toggles may obviously be flexed, and the beams G and I raised by the same lever F, if desired; but, as here shown, said beams are raised by two springs. For this purpose two levers, L L, are provided and severally pivoted on the inner faces of the posts D'. The short arms of said levers are connected with the beam G by rods or links $l\,l$, and the longer arms to the contracting coiled springs L' L', which at their lower ends are attached to the floor or to the base-beams $D^2$ of the machine-frame.

The upper ends of the rods H pass through iron end pieces, I', upon the beam I, and are adjustably secured by nuts $h'\,h^2$, placed respectively above and below them. The beam I is provided with truss-rods $i\,i$ to give rigidity thereto, said rods being applied, in the manner above described, in connection with the beam G, or in any approved manner. I' are terminal castings, fastened to the ends of the beam I, and adapted to afford proper attachment for the rods H and $i$, as shown.

In order to limit the backward swinging movement of the beam I, a pin, H', Fig. 2, is inserted in the post D', projecting far enough to engage the rod. The lateral movements of the beam I are given by the hand of the operator, though, if desired, it may be effected by suitable connection with the operating-lever F.

The yielding slat-supports J J, as here shown, are pivoted upon the inside faces of the posts D D' at $j^2$, and severally consist of the arms $j j'$, connected by a cross-piece, $j^3$, which is provided with a recess, $j^4$, to receive the end of the slat. The arm $j$ extends beyond the pivotal point $j^2$, and is attached to the end of a contracting coiled spring, J', the other end of which is fastened to the post D. The springs J' hold the supports J normally in an elevated position, so as to sustain the slat just over the staple-points. When the beam I descends, said springs yield readily and allow the slat to be carried downward. The notches $j^4$ are so situated as to hold the slat in exact position both laterally and longitudinally over the cones.

The cones A, provided, as described, with the reciprocating staple-holder and guide $A^3$, may be used without the special forcing-machine with which they are here illustrated, for they may be set in a proper series upon a table, and the slat forced down upon one at a time by means of a blow from a hammer.

Relative to the specific features of construction in the cone, it may be remarked that the passage through the thimble $A^2$ is smaller than the aperture A', so that a shoulder, $a^6$, is presented at the bottom of the thimble. Either this shoulder, operating as a stop for the head $a^2$ on the pin $A^3$, or the cross-bar $a'$, passing between the ends $a^3$ of the pin, may operate to limit the upward throw of the said pin. In the use of the screw-plug $A^5$ the thimble $A^2$ may be permanently fixed and the movable parts taken out and inserted, when desired, through the bottom of the cone. For all purposes of construction in making the cone the thimble $A^2$ is not necessary, since the projection thereby afforded could be formed on the casting, and a cross-bar, $a'$, of steel, inserted; but the protruding end of said thimble is exposed to considerable wear, and it is found desirable, on the whole, to make a removable thimble of steel, that may be replaced when necessary. It is usually secured by being tightly driven into the hole made to receive it, and its shoulder $a^6$ affords means for driving it out when its removal is necessary.

Of course it is obvious that the part A, herein shown and denominated a "cone," is not necessarily of strictly conical form, though such form is obviously preferable to any other shape that might be given to said support. The word "cone" will therefore be understood as applying to any suitable support about which the spring S may be placed for the purposes of this invention. Said cone or support may be made of wood, or a cone of wood may be applied around a central post continuous with the thimble.

By means of a longitudinal slot or slots, $C^2$, in the beam, the cams may be moved thereon and as many or as few cones employed as desired, and as near to or remote from each other as may be desired. Usually from twelve to fourteen cones will be used.

We claim as our invention—

1. As a means for supporting a conical bed-spring having a transverse part, $s$, and a fastening-staple intended to embrace the part $s$ preparatory to the attachment of the spring to a bed-slat, the device described, consisting essentially of the cone A, provided with a part, $a'$, for sustaining the wire and staple, and yielding staple-guides $a^3$, substantially as described, and for the purposes set forth.

2. In combination with a suitable support, a series of spring and staple-supporting cones A, corresponding in number with the number of springs to be attached to a single bed-slat and arranged in a straight line, substantially as described, and for the purposes set forth.

3. In a machine for fastening conical wire springs to bed-slats, the combination of a series of cones adapted to support the springs, and fastening-staples and means for simultaneously forcing the slat upon all the staples, substantially as described.

4. In a machine for fastening conical wire springs to bed-slats, the combination, with a series of stationary cones for supporting the springs and their fastening-staples, of a movable beam arranged to press the slat simultaneously upon all the fastenings, together with mechanism for imparting the pressure, substantially as described.

5. In the machine described, the combination, with the beam C, bearing a series of cones, A, adapted to support the springs and their fastening-staples, of the presser-beam I, having both a vertical and a lateral movement, together with mechanism for actuating said presser, substantially as described.

6. In a machine for fastening springs to bed-slats, the combination, with devices for supporting the springs and their fastenings, of devices for supporting the slat in position to receive the fastenings, substantially as described.

7. In the machine described, the combination, with the frame-uprights supporting the cone-beam C, of the beam G, toggles E, connecting the beams C and G, rods H, pivoted to the ends of the beam G, and the presser-beam I, supported by the rods I', together with suitable means for actuating the toggles, substantially as described.

8. In combination with the fixedly-supported cones A and movable presser-beam I, the slat-supports J, constructed to hold the slat in proper position to receive the presser, and provided with springs whereby they yield to the presser, substantially as described.

9. In combination with the cone A, having the vertical passage A', the cross-bar $a$, bifurcated pin $A^3$, spring $A^4$, and means for supporting the spring, substantially as described, and for the purposes set forth.

10. In combination with the cone having the passage A', the cross-bar $a'$, bifurcated pin $A^3$, spring $A^4$, and screw-plug $A^5$, substantially as described.

11. In combination with the apertured cone A and bifurcated yielding staple-holder $A^3$, the removable thimble $A^2$, provided with the cross-bar $a'$, substantially as described.

12. In the support for a conical bed-spring and its fastening-staple, substantially as described, the yielding staple-supports $a^3$, provided with grooves $a^4$, substantially as described.

13. In the cone-spring support described, the combination, with the yielding staple-holders $a^3$, having grooves $a^4$, of the fixed cross-bar $a'$, provided with a transverse groove, $a^5$, substantially as described.

14. The cone-support C, provided with a longitudinal slot, $c^2$, in combination with the cones having depending bolts $a$ and nuts $a'$, substantially as described, and for the purposes set forth.

In testimony that we claim the foregoing as our invention, we affix our signatures in presence of two witnesses.

CHARLES L. AMES.
ABEL H. FROST.

Witnesses:
M. E. DAYTON,
PETER J. ELLERT.